United States Patent [19]

Asanuma et al.

[11] Patent Number: 5,225,507
[45] Date of Patent: Jul. 6, 1993

[54] POLYMER AND POLYPROPYLENE RESIN COMPOSITION

[75] Inventors: Tadashi Asanuma; Kaoru Kawanishi; Hiroshi Matsuzawa; Yukari Nishimori, all of Takaishi, Japan

[73] Assignee: Mitsui Toatsu Chemicals, Inc., Tokyo, Japan

[21] Appl. No.: 628,357

[22] Filed: Dec. 17, 1990

[30] Foreign Application Priority Data

Dec. 28, 1989 [JP] Japan ................................. 1-338203
Jan. 24, 1990 [JP] Japan ................................. 2-12420

[51] Int. Cl.$^5$ ...................... C08F 30/08; C08F 130/08
[52] U.S. Cl. .................................. 526/279; 525/268; 525/288; 526/134; 526/170
[58] Field of Search ............... 525/288, 268, 323, 324, 525/478, 479; 526/279

[56] References Cited

U.S. PATENT DOCUMENTS

| | | |
|---|---|---|
| 3,223,686 | 12/1965 | Natta et al. |
| 3,240,768 | 3/1966 | Guenther ........................ 526/279 |
| 3,258,455 | 6/1966 | Natta et al. |
| 3,644,306 | 2/1972 | Longi et al. ..................... 526/279 |
| 4,892,851 | 1/1990 | Ewen et al. ..................... 502/104 |
| 5,045,597 | 9/1991 | Asanuma et al. ............... 525/72 |
| 5,081,190 | 1/1992 | Asanuma et al. ............... 525/288 |
| 5,082,893 | 1/1992 | Asanuma et al. ............... 524/547 |
| 5,085,895 | 2/1992 | Asanuma et al. ............... 526/279 |

FOREIGN PATENT DOCUMENTS 0363990 10/1988 European Pat. Off.
0321259 6/1989 European Pat. Off.
2-22310 1/1990 Japan.

OTHER PUBLICATIONS

Ewen et al. (1988) J. Am. Chem. Soc. 110, pp. 6255-6256.
Kaminsky et al. (1985) Angow. Chem. Int. Ed. Engl. 24, pp. 507-508.
Ewen et al. (1984) J. Am. Chem. Soc. 106, pp. 6355-6364.

Primary Examiner—John Kight, III
Assistant Examiner—Shelly A. Dodson
Attorney, Agent, or Firm—Burns, Doane, Swecker & Mathis

[57] ABSTRACT

There is disclosed a homopolymer of an alkenylsilane having a syndiotactic structure and a copolymer of the alkenylsilane and an α-olefin. The polymer and the copolymer can be prepared by subjecting the alkenylsilane or the alkenylsilane and the α-olefin to addition polymerization in the presence of a transition metal compound having asymmetirically interconnected ligands or preferably in the presence of the transition metal compound and aluminoxane. The polymer and the copolymer can be used as a nucleating agent for a crystalline polypropylene.

18 Claims, 4 Drawing Sheets

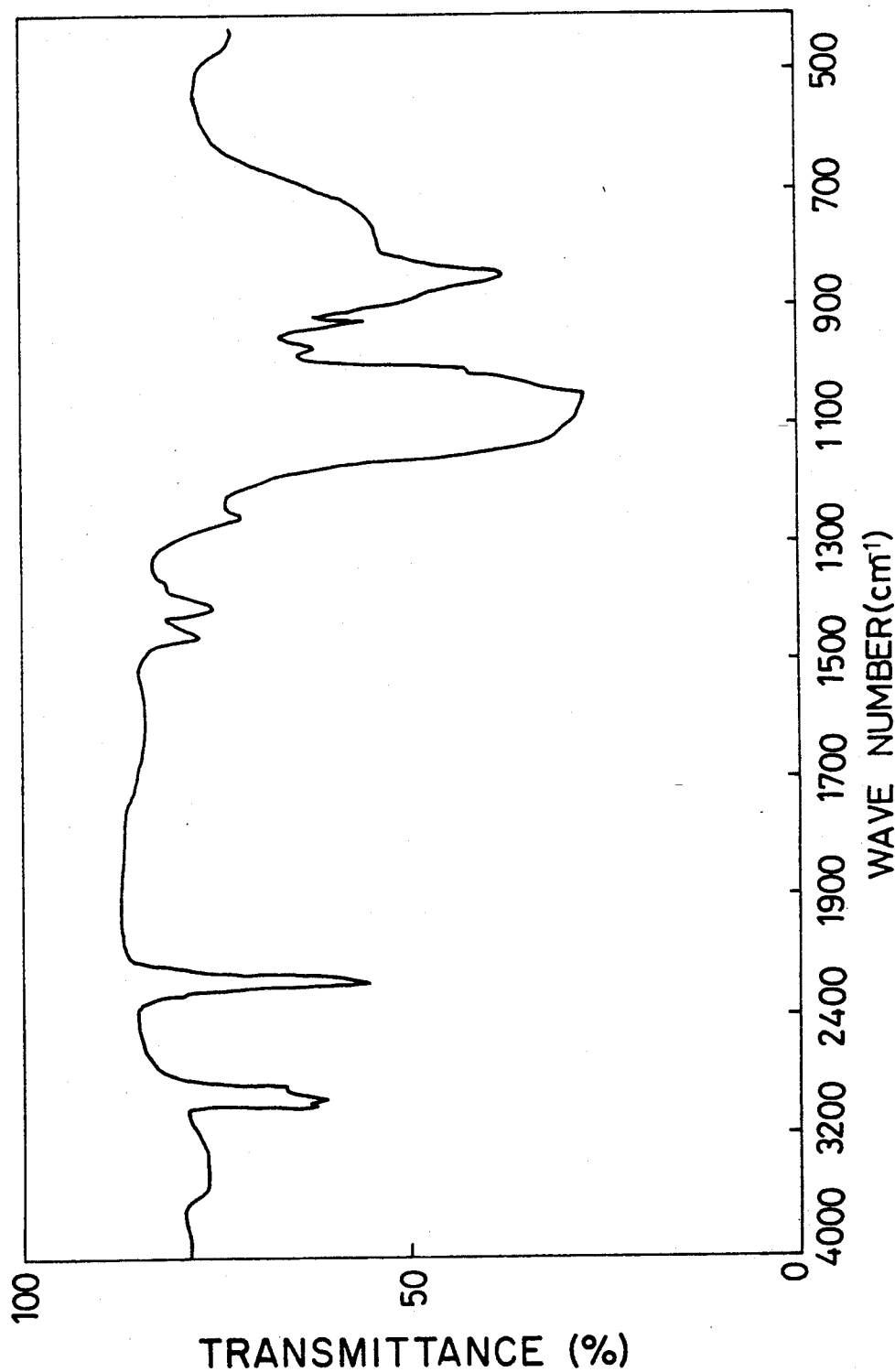

POLYMER AND POLYPROPYLENE RESIN COMPOSITION

BACKGROUND OF THE INVENTION (i) Field of the Invention

The present invention relates to an alkenylsilane containing (co)polymer having a substantially syndiotactic structure, a method for preparing, and use of the same.

(ii) Description of the Related Art

A polymerization process of an alkenylsilane is disclosed in U.S. Pat. No. 3,223,686, but in this process, a catalyst comprising titanium chloride and an organic aluminum compound is used and this kind of catalyst is poor in activity Therefore, the resulting polyalkenylsilane has a stereostructure which is a substantially isotactic structure.

It can be expected that an alkenylsilane containing (co)polymer has various functions. Therefore, if the alkenylsilane containing (co)polymer having a stereostructure other than an isotactic structure is obtained in a high yield per unit weight of a catalyst, there is the expectation that the above-mentioned (co)polymer will be applied in a variety of industrial fields.

SUMMARY OF THE INVENTION

An object of the present invention is to provide a novel polymer and copolymer of an alkenylsilane having a substantially syndiotactic structure.

Another object of the present invention is to provide a polymerization method for obtaining a novel polymer and a copolymer of an alkenylsilane having a substantially syndiotactic structure.

Still another object of the present invention is to provide a novel use of a polymer and a copolymer of an alkenylsilane having a substantially syndiotactic structure.

Other objects of the present invention will be apparent from the following description.

The first aspect of the present invention is directed to an alkenylsilane containing (co)polymer having a substantially syndiotactic structure which comprises repeating units represented by the formula (I)

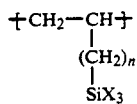

(I)

(wherein n is an integer of from 0 to 10, X is a hydrogen atom, a halogen atom or a hydrocarbon residue having 1 to 20 carbon atoms, and the three Xs may be identical or different) and repeating units represented by the formula (II)

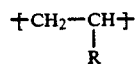

(II)

(wherein R is a hydrogen atom or a straight-chain or branched alkyl group having 1 to 23 carbon atoms), the amount of the repeating units of the formula (II) being smaller than that of the repeating units of the formula (I), the intrinsic viscosity of the polymer measured in a tetralin solution at 135° C. being 0.01 or more.

The second aspect of the present invention is directed to a method for preparing an alkenylsilane containing (co)polymer which comprises the step of subjecting, to addition polymerization, an alkenylsilane represented by the formula (VI)

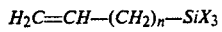

(VI)

(wherein n is an integer of from 0 to 10, X is a hydrogen atom, a halogen atom or a hydrocarbon residue having 1 to 20 carbon atoms, and the three X's may be identical or different), if desired, together with an α-olefin having 2 to 25 carbon atoms which may be branched, in the presence of a catalyst comprising a transition metal compound having asymetirically interconnected ligands, the amount of the α-olefin being smaller than that of the alkenylsilane.

The third aspect of the present invention is directed to a polypropylene resin composition which comprises the alkenylsilane containing (co)polymer and a crystalline polypropylene.

BRIEF DESCRIPTION OF THE DRAWINGS

FIG. 4 is the infrared absorption spectrum of a comparative polymer of trimethylvinylsilane having an isotactic structure prepared in accordance with Comparative Example 2.

DETAILED DESCRIPTION OF THE PREFERRED EMBODIMENTS

Figure 1:
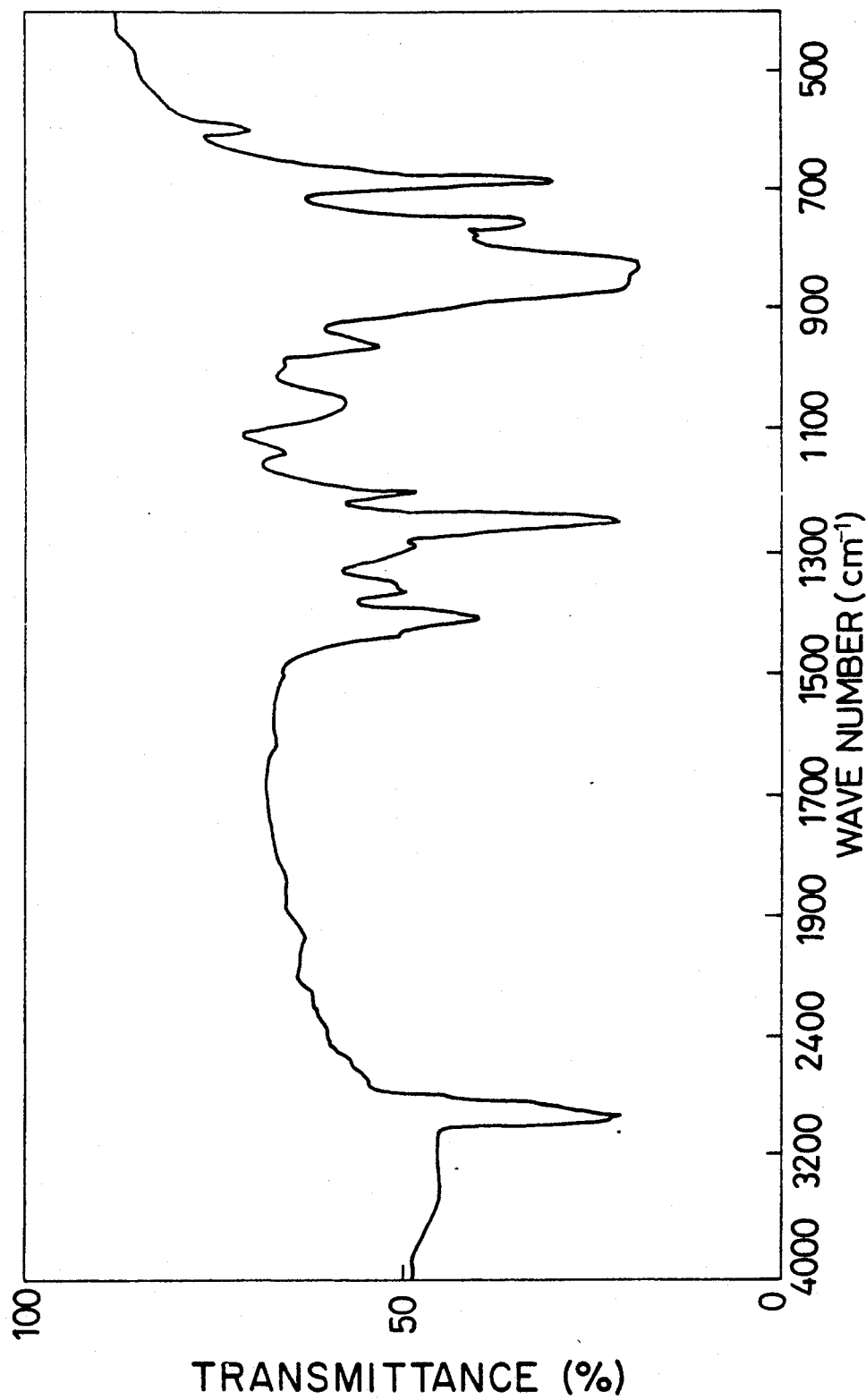
FIG. 1 is the infrared absorption spectrum of a polymer of trimethylallylsilane having a syndiotactic structure prepared in accordance with Example 1 of the present invention.

A transition metal compound having asymetirically interconnected ligands which is used in the addition polymerization of an alkenylsilane according to the present invention is represented by the formula (III)

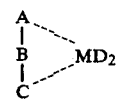

(III)

(wherein A and C are mutually different aromatic hydrocarbon groups, B is an alkylene group or a cycloalkylene group having 1 to 20 carbon atoms, M is titanium, zirconium or hafnium, and D is a halogen atom or an alkyl group having 1 to 20 carbon atoms).

In the formula (III), examples of the aromatic hydrocarbon group include a cyclopentadienyl group, an indenyl group, a fluorenyl group and nuclear substituents thereof. Furthermore, the two Ds may be identical or different.

Typical examples of the compound represented by the formula (III) are isopropyl(cyclopentadienyl-1-fluorenyl)hafnium dichloride and isopropyl(cyclopentadienyl-1-fluorenyl)zirconium dichloride which are mentioned in J. A. Ewen et al., J. Amer. Chem. Soc., 110, 6255-6256 (1988).

In the addition polymerization, the transition compound of the formula (III) and an aluminoxane can be used together, and this aluminoxane is represented by the formula (IV) or (V)

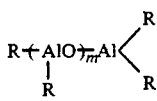  (IV)

  (V)

(wherein R is a hydrocarbon residue having 1 to 3 carbon atoms, and m is a value of 5 or more, preferably 10 or more). The amount of the aluminoxane to be used is from 10 to 1,000,000 mole times, preferably from 50 to 5,000 mole times as much as that of the aforesaid transition metal compound.

In addition to the above-mentioned catalysts, another catalyst can also be used which is a combination of a boron compound and the transition compound represented by the formula (III) wherein at least one of the two D's is an alkyl group. Some examples of this boron compound are disclosed in Japanese Patent Laid-open No. 1-501950 (WO88/05792) and Japanese Patent Laid-open No. 1-502036 (WO88/05793), and typical examples of the boron compound include a three-substituted ammonium salt of a borane or a carborane, a two-substituted ammonium salt of a metallic borane or a metallic carborane anion, and a three-substituted ammonium salt of a tetra(substituted aromatic) boron compound [N,N-dimethylaniliniumtetra(pentafluorophenyl)boron, tri(n-butyl)ammoniumtetra(pentafluorophenyl)boron or the like].

The alkenylsilane used in the present invention can be represented by the general formula (VI)

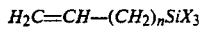  (VI)

(wherein n is an integer of from 0 to 10, X is a hydrogen atom, a halogen atom or a hydrocarbon residue, preferably an alkyl group having 1 to 20 carbon atoms, and the three Xs may be identical or different). Typical examples of the alkenylsilane include vinylsilane, allylsilane, butenylsilane, pentenylsilane, hexenylsilane and these compounds in which the hydrogen atom of the Si—H group is substituted by an alkyl group or a halogen atom.

For the polymerization of the alkenylsilane, various known polymerization techniques are utilizable such as solvent polymerization using an inert solvent, bulk polymerization in which any inert solvent is not substantially present and in which the alkenylsilane itself is used as the solvent, and gas phase polymerization. Usually, polymerization temperature is in the range of from −100° to 200° C. and polymerization pressure is in the range of from atmospheric pressure to 10 kg/cm². Preferably, the polymerization temperature is in the range of from −100° to 100° C. and the polymerization pressure is in the range of from atmospheric pressure to 5 kg/cm².

When the alkenylsilane having the formula (VI) is polymerized under the above-mentioned polymerization conditions by the use of the above-mentioned catalyst, a polyalkenylsilane having a syndiotactic structure can be obtained in a high yield per unit weight of the catalyst. Preferably, the amount of the transition compound of the formula (III) is divided into two or more portions and they are then added to the reaction system separately, and in this case, the polymerization can be achieved in a higher yield per unit weight of the catalyst.

In the present invention, the alkenylsilane of the formula (VI) can be copolymerized with an α-olefin in an amount less than that of the alkenylsilane, preferably in an amount of 40% by weight or less, more preferably 20% by weight or less of the weight of the alkenylsilane under the above-mentioned polymerization conditions by the use of the above-mentioned catalyst. The α-olefin is represented by the formula (VII)

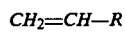  (VII)

(wherein R is a hydrogen atom or an alkyl group having 1 to 23 carbon atoms which may be branched), and typical examples of the α-olefin include straight-chain olefins such as butene-1, pentene-1, hexene-1, heptene-1, octene-1, nonene-1, decene-1, undecene-1, dodecene-1, tridecene-1, pentadecene-1, hexadecene-1, heptadecene-1 and octadecene-1 as well as branched olefins such as 3-methylbutene-1, 4-methylpentene-1 and 4,4-dimethylpentene-1.

According to the above-mentioned method, there can be obtained a polyalkenylsilane containing the repeating units of the formula (I) and having a substantially syndiotactic structure, and a copolymer of an alkenylsilane containing the repeating units of the formula (I) and the repeating units of the formula (II) in an amount less than that of the repeating units of the formula (I) and having a substantially syndiotactic structure. The molecular weight of each polymer is such that its intrinsic viscosity measured in a tetralin solution at 135° C. is 0.01 or more, preferably from about 0.05 to about 10.

In the present invention, examples of the highly crystalline polypropylene include an isotactic polypropylene and a syndiotactic polypropylene. The isotactic polypropylene has a pentad fraction of 0.7 or more, preferably 0.8 or more [A. Zambelli et al., Macromolecules, 6, 925 (1973), and ibid., 8, 687 (1975)], and the above-mentioned pentad fraction is a value obtained by calculating on the basis of the peak of a methyl group measured by $^{13}$C-NMR. For the manufacture of the isotactic polypropylene, various methods are known. Moreover, the isotactic polypropylenes with various trade names are commercially available.

The highly crystalline syndiotactic polypropylene having a syndiotactic pentad fraction of more than 0.7 has been discovered for the first time by J. A. Ewen et al. which can be obtained by the use of a catalyst comprising a transition metal compound having asymmetric ligands and an aluminoxane (J. Amer. Chem. Soc., 110, 6255–6256, 1988).

According to this process, the syndiotactic polypropylene having a syndiotactic pentad fraction of more than 0.7 can be obtained. Furthermore, when the polymerization is carried out at a lower temperature or when the obtained polymer is washed with a hydrocarbon compound, the polypropylene having a syndiotactic pentad fraction of 0.9 or more can be obtained. Another optional catalyst which is different from the catalyst disclosed in the above-mentioned literature can also be utilized, so long as it can provide the polypropylene having the highly syndiotactic structure as described above.

The syndiotactic polypropylenes prepared by a process other than described above are also utilizable, but the syndiotactic polypropylene which can be utilized in the composition of the present invention has a syndiotactic pentad fraction of 0.6 or more, preferably 0.7 or more. Here, as the crystalline polypropylene, there can also be used the following copolymer and polypropylene resin compositions, so long as they exhibit high crystallinity, in addition to the homopolymer of propylene having the above-mentioned isotactic or syndiotactic structure.

(a) A copolymer of 10 mole % or less of ethylene or an α-olefin having 4 or more carbon atoms and propylene.

(b) A block copolymer obtained by first polymerizing propylene substantially singly, and then in this system, polymerizing ethylene and propylene.

(c) A mixture of a polypropylene homopolymer having an isotactic and/or syndiotactic structure and a polyethylene or ethylene-propylene copolymer.

The amount of the alkenylsilane containing (co)polymer is preferably from 0.0001 to 10 parts by weight, more preferably from 0.001 to 8 parts by weight, particularly preferably from 0.05 to 5 parts by weight with respect to 100 parts by weight of a composition comprising the highly crystalline polypropylene and the alkenylsilane. When the amount of the alkenylsilane containing (co)polymer is less than 0.0001 part by weight, the (co)polymer cannot possess any effect as a nucleating agent, and when it is more than 10 parts by weight, moldability is poor.

No particular restriction is put on a mixing manner of the highly crystalline polypropylene and the alkenylsilane (co)polymer, and the usual mixing manner which is used in mixing a polyolefin with additives can be utilized without any modification. The mixing can usually be carried out at a temperature of the melting point or less of the highly crystalline polypropylene in a mixing machine such as a Henschel mixer. In general, the resulting mixture is then melted, mixed and extruded through an extruder in order to form pellets.

In mixing the nucleating agent with the highly crystalline polypropylene, various additives also can be added thereto alone or in combination which are, for example, an antioxidant, a lubricant, an ultraviolet light absorber, an ultraviolet stabilizer, a heat stabilizer, an antistatic agent and an organic or inorganic pigment. Typical examples of these kinds of additives include those which can usually be added to a polyolefin resin, and they can be used in such a range as not to impair the effect of the present invention.

The alkenylsilane containing (co)polymer, particularly the homopolymer of the alkenylsilane and the polymer containing a small amount of, preferably 40% by weight or less, more preferably 20% by weight or less of the α-olefin units according to the present invention is useful as a nucleating agent for a highly crystalline polypropylene.

The present invention will be described in more detail in reference to examples and comparative examples. These examples do not intend to restrict the present invention, but to elucidate the present invention.

EXAMPLE 1

Isopropyl(cyclopentadienyl-1-fluorenyl)zirconium dichloride was prepared by converting isopropylcyclopentadienyl-1-fluorene synthesized in an ordinary manner into a lithium salt and then reacting the lithium salt with zirconium tetrachloride In a 300-milliliter autoclave, 1 mg of the isopropyl(cyclopentadienyl-1-fluorenyl)zirconium dichloride and 0.34 g of methylaluminoxane having a polymerization degree of about 16 made by Tosoh Akzo Co., Ltd. were dissolved in a mixture of 10 g of trimethylallylsilane and 10 g of toluene, and stirring was then continued at 30° C. for 10 minutes. Afterward, 1 mg of isopropyl(cyclopentadienyl-1--fluorenyl)zirconium dichloride and 0.34 g of methylaluminoxane were further added thereto, followed by stirring for 2 hours.

Figure 2:
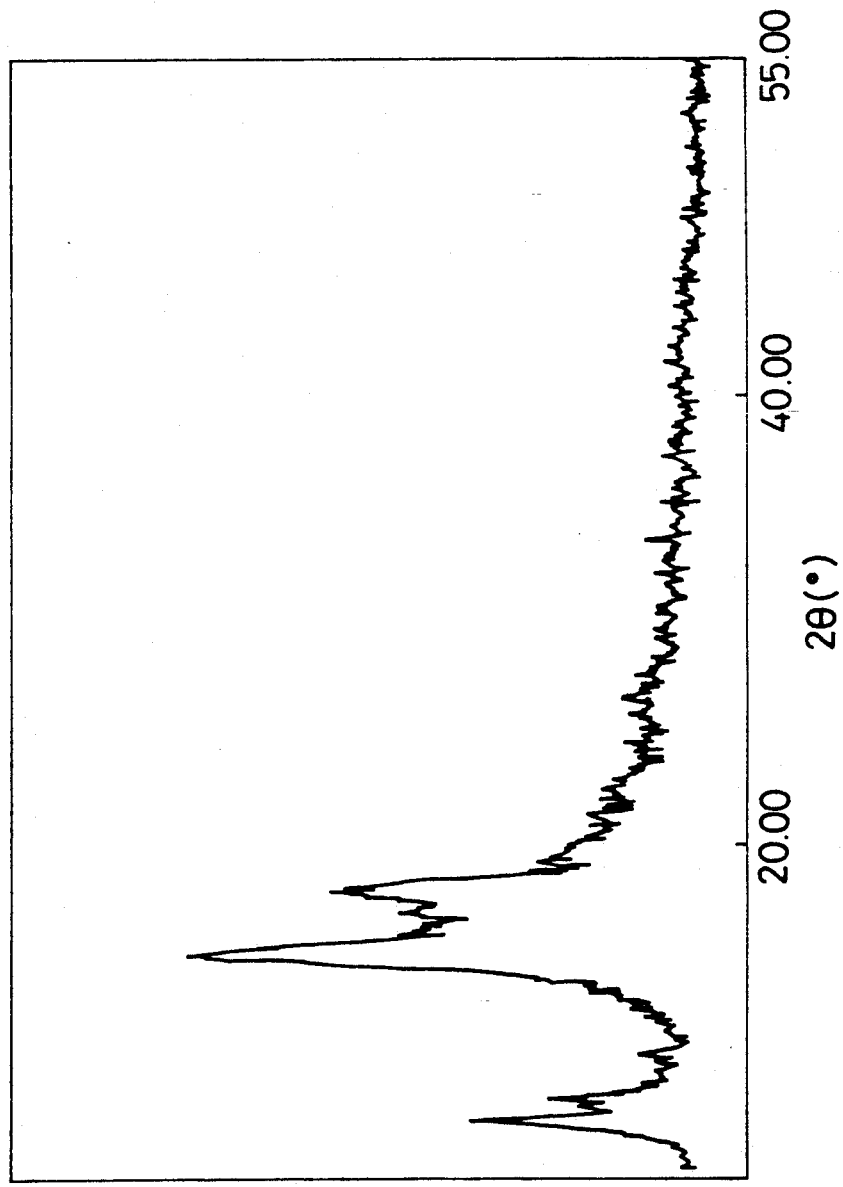
FIG. 2 is the X-ray diffraction spectrum of a polymer of trimethylallylsilane having a syndiotactic structure prepared in accordance with Example 1 of the present invention.

After completion of the polymerization, the resulting polymerization mixture was added to 100 ml of methanol so as to precipitate a polymer. After drying, 9.5 g of the polymer were obtained. The infrared absorption spectrum of the polymer is shown in FIG. 1. When measured by elevating and lowering the temperature of the polymer at 10° C./minute in accordance with differential scanning thermal analysis, the melting point and the crystallization temperature of the polymer were 263.7° C. and 239.6° C., respectively. When measured in a tetralin solution at 135° C., the intrinsic viscosity (hereinafter abbreviated to "$\eta$") of the polymer is 0.48, and when measured by a gel permeation chromatography, the molecular weight of the polymer was $2.7 \times 10^5$. In addition, when measurement was made by dissolving the product in 1,2,4-trichlorobenzene and using $^{13}$C-NMR, four peaks were observed which were correspondent to $Si(CH_3)_3$ at 0.06 ppm, $CH_2$ of a side chain at 23.7 ppm, CH of the main chain at 29.2 ppm and $CH_2$ of the main chain at 46.6 ppm on the basis of tetramethylsilane, and the intensity ratio of these peaks was 3:1:1:1. Moreover, the measured results of the X-ray diffraction spectrum of this polymer are shown in FIG. 2.

COMPARATIVE EXAMPLE 1

The same procedure as in Example 1 was effected except that a catalyst was used which comprised 0.2 ml of triethylaluminum and 10 mg of a transition metal catalyst component containing 2.5% by weight of titanium and prepared by grinding magnesium chloride and titanium tetrachloride together, in order to only obtain 1.5 g of a polymer. According to $^{13}$C-NMR of the resulting polymer, four peaks were observed at about 0.4, 23.0, 29.9 and 45.9 ppm on the basis of tetramethylsilane, and the intensity ratio of these peaks was 3:1:1:1.

EXAMPLE 2

Figure 3:
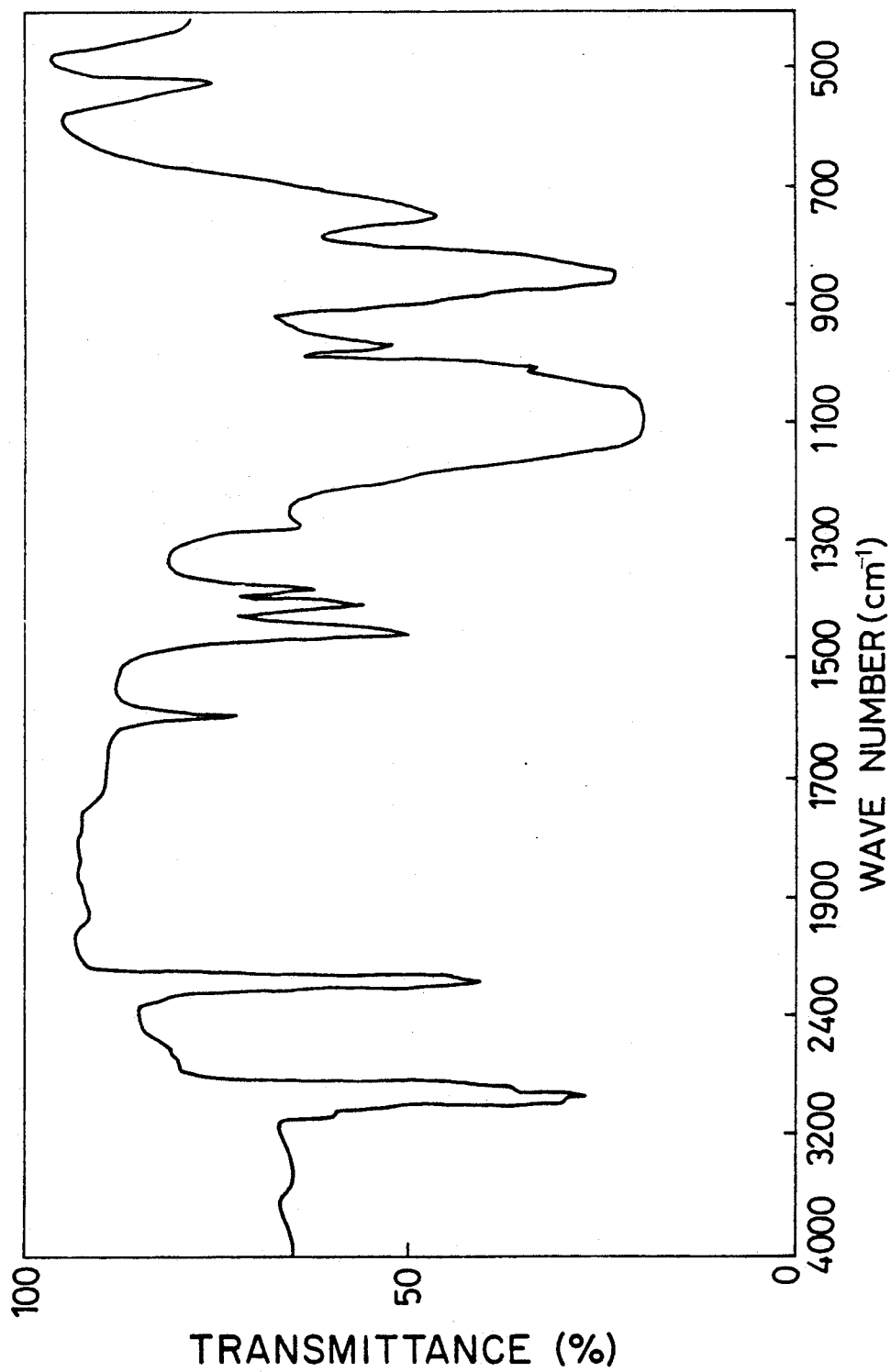
FIG. 3 is the infrared absorption spectrum of a polymer of trimethylvinylsilane having a syndiotactic structure prepared in accordance with Example 2 of the present invention.

The same procedure as in Example 1 was effected except that trimethylallylsilane was replaced with trimethylvinylsilane, in order to obtain 2 g of a polymer. The infrared absorption spectrum of the thus obtained polymer is shown in FIG. 3. Furthermore, the portion of the polymer which had been dissolved in tetralin at 135° C. had an intrinsic viscosity of 0.23.

COMPARATIVE EXAMPLE 2

The same procedure as in Example 2 was effected except that the same catalyst as in Comparative Example 1 was used, in order to only obtain 0.2 g of a polymer. From the infrared absorption spectrum of the polymer shown in FIG. 4, it can be presumed that the polymer is different in structure than the polymer obtained in Example 2.

EXAMPLE 3

First, 10 mg of isopropyl(cyclopentadienyl-1-fluorenyl)zirconium dichloride obtained in Example 1 and 1.34 g of methylaluminoxane having a polymerization degree of about 16 made by Tosoh Akzo Co., Ltd.

were dissolved in 4 liters of toluene. The resulting mixture was placed into a 7-liter autoclave, and propylene was then charged thereinto. Next, polymerization was carried out at a polymerization temperature of 30° C. under a polymerization pressure of 2 kg/cm²-G for 1 hour. After completion of the reaction, unreacted propylene was purged, and the resulting polymerization mixture was taken out and then filtered at 30° C. The obtained polymer was washed with 1,500 ml of toluene five times, and then dried at 80° C. under reduced pressure, thereby obtaining 580 g of a powdery polypropylene. According to $^{13}$C-NMR, the syndiotactic pentad fraction of this polypropylene was 0.912, and $\eta$ was 1.24.

To 99.9 parts of this powdery polypropylene was added 0.1 part by weight of the polymer of trimethylallylsilane obtained in Example 1. When measured by melting the resin composition at 250° C. and then lowering its temperature at 10° C./minute in accordance with differential scanning thermal analysis, the melting point of the resin composition which was observed as a peak temperature was 105° C.

The resin composition was then press-molded at 250° C. to form a sheet having a thickness of 1 mm. The following physical properties were measured.

| | |
|---|---|
| Flexural stiffness: kg/cm² | ASTM D-747 (23° C.) |
| Tensile yield strength: kg/cm² | ASTM D-638 (23° C.) |
| Elongation: % | ASTM D-638 (23° C.) |
| Izod impact strength (notched): kg · cm/cm | ASTM D-256 (23° C., −10° C.) |

The flexural stiffness, the tensile yield strength, the elongation and the Izod impact strength (23° C., −10° C.) were 6,700 kg/cm², 265 kg/cm², 420%, and 14.6 and 2.8 kg·cm/cm, respectively.

In contrast, when no polytrimethylallylsilane was added, the flexural stiffness, the tensile yield strength, the elongation and the Izod impact strength (23° C., −10° C.) of a molded sheet were 4,800 kg/cm², 210 kg/cm², 680%, 14.0 and 2.1 kg·cm/cm, respectively.

EXAMPLE 4

With regard to a resin composition obtained by adding 0.1 part by weight of a polymer of trimethylallylsilane obtained in Example 1 to 99.9 parts by weight of an isotactic polypropylene JHH-G made by Mitsui Toatsu Chemicals, Inc., physical properties were measured in the same manner as in Example 3. As a result, flexural stiffness, tensile yield strength and elongation were 2,000 kg/cm², 375 kg/cm² and 360%, respectively.

On the other hand, when the polymer of trimethylallylsilane was not used, the flexural stiffness, the tensile yield strength and the elongation of a molded sheet were 1,800 kg/cm², 350 kg/cm² and 680%, respectively.

EXAMPLE 5

The same procedure as in Example 4 was effected except that an isotactic polypropylene-ethylene block copolymer BJHH-G made by Mitsui Toatsu Chemicals, Inc. was used as a crystalline polypropylene, and with regard to the resulting sheet, flexural stiffness, tensile yield strength, elongation and Izod impact strength (23° C., −10° C.) were 1,700 kg/cm², 315 kg/cm², 390%, and 7.0 and 3.5 kg·cm/cm, respectively.

On the other hand, when the polymer of trimethylallylsilane was not used, the flexural stiffness, the tensile yield strength, the elongation and the Izod impact strength (23° C., −10° C.) of a molded sheet were 1,500 kg/cm², 290 kg/cm², 570%, and 7.1 and 3.5 kg·cm/cm, respectively.

EXAMPLE 6

The same procedure as in Example 3 was effected except that the polymer of vinylsilane obtained in Example 2 was used. With regard to the resulting sheet, flexural stiffness, tensile yield strength, elongation and Izod impact strength (23° C., −10° C.) were 4,900 kg/cm², 230 kg/cm², 540%, and 14.0 and 2.3 kg·cm/cm, respectively.

As understood from the foregoing, a polymer of the present invention is novel and utilizable as a nucleating agent for a crystalline polypropylene. In addition, it can be expected that the polymer of the present invention will be utilized in various uses, and therefore, the polymer of the present invention is industrially very valuable.

What is claimed is:

1. An alkenylsilane containing polymer having a substantially syndiotactic structure which comprises repeating units represented by the formula (I)

wherein n is an integer of from 0 to 10, X is a hydrogen atom, a halogen atom or a hydrocarbon residue having 1 to 20 carbon atoms, and the three Xs may be identical or different and repeating units represented by the formula (II)

wherein R is a hydrogen atom or a straight-chain or branched alkyl group having 1 to 23 carbon atoms, the amount of the repeating units of the formula (II) being smaller than that of the repeating units of the formula (I), the intrinsic viscosity of the polymer measured in a tetralin solution at 135° C. being 0.01 or more.

2. The polymer according to claim 1 which is a homopolymer of the alkenylsilane.

3. The polymer according to claim 1 which is a polytrimethylvinylsilane.

4. The polymer according to claim 1 which is a polytrimethylallylsilane.

5. The polymer according to claim 1 wherein the intrinsic viscosity is from 0.01 to 10.

6. A method for preparing an alkenylsilane containing polymer according to claim 1 which comprises the step of subjecting, to addition polymerization, an alkenylsilane represented by the formula (VI)

wherein n is an integer of from 0 to 10, X is a hydrogen atom, a halogen atom or a hydrocarbon residue having 1 to 20 carbon atoms, and the three Xs may be identical or different, or together with an α-olefin having 2 to 25 carbon atoms which may be branched, in the presence of a catalyst comprising a transition metal compound represented by the formula (III)

  (III)

wherein A and C are mutually different aromatic hydrocarbon groups, B is an alkylene group or a cycloalkylene group having 1 to 20 carbon atoms, M is titanium, zirconium or hafnium, D is a halogen atom or an alyl group having 1 to 20 carbon atoms, and the two Ds may be identical or different, the amount of the $\alpha$-olefin being smaller than that of the alkenylsilane.

7. The method according to claim 6 wherein the catalyst is divided into 2 or more portions and then added to the system separately.

8. The method according to claim 6 wherein an aluminoxane represented by the formula (IV) or (V)

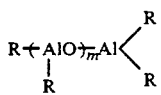  (IV)

  (V)

wherein R is a hydrocarbon residue having 1 to 3 carbon atoms, and m is a value of 5 or more is used in the addition polymerization.

9. The method according to claim 6 wherein the polymerization is carried out at a temperature of from $-100°$ C. to 200° C. under a pressure of from atmospheric pressure to 10 kg/cm$^2$.

10. A polypropylene resin composition which comprises an alkenylsilane containing polymer according to claim 1 and a crystalline polypropylene, the amount of the alkenylsilane containing polymer being from 0.0001 to 10 parts by weight with respect to 100 parts by weight of the polypropylene resin composition.

11. The polypropylene resin composition according to claim 10 wherein the crystalline polypropylene is a propylene homopolymer having a syndiotactic or isotactic structure, a copolymer of 10 mole % or less of ethylene or an $\alpha$-olefin having 4 or more carbon atoms and propylene, a block copolymer of propylene and ethylene, or a mixture of a propylene homopolymer having a syndiotactic or isotactic structure and a polyethylene or an ethylene-propylene copolymer.

12. The polymer according to claim 1 which contains the repeating units of the formula (II) in an amount of 40% by weight or less of the weight of the repeating units of the formula (I).

13. The polymer according to claim 1 which contains the repeating units of the formula (II) in an amount of 20% by weight or less of the weight of the repeating units of the formula (I).

14. The method according to claim 6 wherein only the alkenylsilane is polymerized.

15. The method according to claim 6 wherein the alkenylsilane is copolymerized with the $\alpha$-olefin in an amount of 40% by weight or less of the weight of the alkenylsilane.

16. The method according to claim 6 wherein the alkenylsilane is copolymerized with the $\alpha$-olefin in an amount of 40% by weight or less of the weight of the alkenylsilane.

17. The method according to claim 6 wherein the alkenylsilane is copolymerized with the $\alpha$-olefin in an amount of 20% by weight or less of the weight of the alkenylsilane.

18. The method according to claim 6 wherein a boron compound selected from the group consisting of three-substituted ammonium salts of boranes or carboranes, two-substituted ammonium salts of metallic borane or carborane anions, and three substituted ammonium salts of tetra(substituted aromatic) boron compounds is used in the addition polymerization when at least one of the two Ds in the formula (III) is an alkyl group.

* * * * *

UNITED STATES PATENT AND TRADEMARK OFFICE
CERTIFICATE OF CORRECTION

PATENT NO. : 5,225,507

DATED : July 6, 1993

INVENTOR(S) : Asanuma et al.

It is certified that error appears in the above-identified patent and that said Letters Patent is hereby corrected as shown below:

Title page, item [57]
In the Abstract, line 7, "asymmetirically" should be --asymmetrically--.

Claim 5, column 8, line 56, "0.01" should be --0.05--.

Claim 6, column 9, line 13, "alyl" should be --alkyl--.

Signed and Sealed this

Ninth Day of August, 1994

Attest:

BRUCE LEHMAN

Attesting Officer

Commissioner of Patents and Trademarks